(12) United States Patent
Komaromi et al.

(10) Patent No.: US 6,989,643 B2
(45) Date of Patent: Jan. 24, 2006

(54) ELECTRICAL DRIVE APPARATUS WHICH CAN BE OPERATED VIA A FULL-BRIDGE CIRCUIT, WITH A DIFFERENT LOAD DEPENDING ON THE DRIVE DIRECTION

(75) Inventors: Patrick Komaromi, Vienna (AT); Gregor Svobodnik, Vienna (AT)

(73) Assignee: Siemens Aktiegesellschaft, Munich (DE)

( * ) Notice: Subject to any disclaimer, the term of this patent is extended or adjusted under 35 U.S.C. 154(b) by 0 days.

(21) Appl. No.: 10/448,042

(22) Filed: May 29, 2003

(65) Prior Publication Data
US 2004/0036430 A1 Feb. 26, 2004

(30) Foreign Application Priority Data
May 29, 2002 (DE) .......................... 102 24 244

(51) Int. Cl.
H02P 1/22 (2006.01)
H02P 3/20 (2006.01)

(52) U.S. Cl. ........................ 318/293; 318/291; 318/439; 318/285; 363/17; 363/136

(58) Field of Classification Search ......... 318/264–267, 318/286, 471, 466, 439, 434, 293, 285, 294, 318/469, 599; 363/17, 98, 132, 136
See application file for complete search history.

(56) References Cited

U.S. PATENT DOCUMENTS

| 4,328,451 A | | 5/1982 | Barge ........................ 318/596 |
| 4,562,387 A | * | 12/1985 | Lehnhoff .................... 318/285 |
| 4,581,565 A | * | 4/1986 | Van Pelt et al. ............ 318/294 |
| 4,705,997 A | * | 11/1987 | Juzswik ...................... 388/811 |
| 4,710,686 A | * | 12/1987 | Guzik ......................... 318/293 |
| 4,879,641 A | * | 11/1989 | Rossi et al. .................. 363/98 |
| 4,988,931 A | * | 1/1991 | Tsukahara et al. .......... 318/293 |
| 5,119,000 A | * | 6/1992 | Schultz ....................... 318/254 |
| 5,153,492 A | * | 10/1992 | Landseadel ................. 318/599 |
| 5,287,046 A | * | 2/1994 | Carpenter et al. .......... 318/293 |
| 5,559,375 A | | 9/1996 | Jo et al. ..................... 307/10.1 |
| 6,100,659 A | * | 8/2000 | Will et al. ................... 318/466 |
| 6,288,507 B1 | * | 9/2001 | Makino et al. .............. 318/293 |
| 6,617,913 B1 | * | 9/2003 | Johnson ...................... 327/423 |

FOREIGN PATENT DOCUMENTS

| DE | 199 44 964 A1 | | 3/2001 |
| EP | 0038214 | | 10/1981 |
| EP | 0 782 268 B1 | | 4/2002 |
| JP | 60055888 | | 4/1985 |
| JP | 07046885 A | * | 2/1995 |
| JP | 08223985 A | * | 8/1996 |
| JP | 2000333488 A | * | 11/2000 |
| JP | 2001037276 A | * | 2/2001 |
| JP | 2001097184 | | 10/2001 |

OTHER PUBLICATIONS

European search report for EP03101411, 3 pages, mailed Mar. 23, 2004.

* cited by examiner

*Primary Examiner*—David Martin
*Assistant Examiner*—Eduardo Colon Santana
(74) *Attorney, Agent, or Firm*—Baker Botts L.L.P.

(57) ABSTRACT

An electrical drive apparatus, in particular, a motor-driven motor vehicle window winder or motor vehicle belt roller, which can be operated via a full bridge circuit with at least four switching elements with a different load depending on the rotation direction, wherein the switching elements are individually designed on the basis of their different maximum loads, in the sense of an asymmetric full bridge.

24 Claims, 2 Drawing Sheets

ELECTRICAL DRIVE APPARATUS WHICH CAN BE OPERATED VIA A FULL-BRIDGE CIRCUIT, WITH A DIFFERENT LOAD DEPENDING ON THE DRIVE DIRECTION

PRIORITY

This application claims foreign priority of the German application DE10224244.5 filed May 29, 2002.

TECHNICAL FIELD OF THE INVENTION

The invention relates to an electrical drive apparatus which can be operated via a full bridge circuit having at least four bridge switching elements in two directions with a different load depending on the drive direction, in particular an electric motor which can be driven in both rotation directions via the bridge switching elements.

BACKGROUND OF THE INVENTION

Full bridges of the above-mentioned type generally have two parallel bridge arms, each having at least two switching elements arranged in series, between the connections of a supplying DC voltage; the drive to be controlled, in particular in the form of an electric motor with a commutator, is connected between the junction points of the series circuit formed by the switching elements and hence in a bridge arm which represents the diagonal to the parallel bridge arms that are fitted with the switching elements. Depending on the rotation direction, a load current flows in a bridge path which either includes the first switching element of the first bridge arm and the second switching element of the other bridge arm or the first switching element of the other bridge arm and the second switching element of the first bridge arm.

Drives such as these are being increasingly used for auxiliary drives in motor vehicles, in particular for motor-driven window winders or for motor-driven belt rollers.

SUMMARY OF THE INVENTION

According to the object of the present invention, the aim is to reduce the production cost for drives of the above-mentioned type while ensuring that they still remain suitable for use.

The respective load, in particular the specific maximum load, is generally defined by thermal data, that is to say not solely by the maximum current level.

On the basis of the knowledge that drives of the above-mentioned type or of a similar type are loaded differently depending on the rotation direction, the specific choice of the bridge switching elements according to the invention on the basis of their arrangement and load in the full bridge in the sense of a corresponding asymmetric full bridge makes it possible to noticeably minimize the costs, in particular when using electronic switching elements, since it is possible to avoid costly derating of the switching elements deliberately in the bridge paths which are subject to less load in one of the rotation directions.

BRIEF DESCRIPTION OF THE DRAWINGS

The invention as well as further advantageous refinements will be described in more detail in the following text using an exemplary embodiment of a full bridge drive for a motor with a commutator whose load is different depending on the rotation direction; in the drawing.

DETAILED DESCRIPTION OF THE PREFERRED EMBODIMENTS

FIGS. 1 to 4 are based on a full bridge circuit with series-connected first and second bridge switching elements S1; S2 which form a first bridge arm, preferably in the form of electronic switching elements, and with series-connected third and fourth bridge switching elements S3; S4, which form a parallel second bridge arm.

The end points of the bridge arms are connected at their end to a battery voltage Ub (positive pole) and at their other end to GND (ground negative pole), in order to supply them with voltage.

Between the junction point of the first bridge switching element S1 and the second bridge switching element S2 on the one hand, and the junction point between the third bridge switching element S3 and the fourth bridge switching element S4 on the other hand, a commutator motor which is fed via brushes B1; B2 is connected in a diagonal arm, as the electric motor M.

When the bridge switching elements S1; S4 are closed and are being fully driven a first load current $I_{L1}$ flows and drives the electric motor M in a first rotation direction n1; when the bridge switching elements (S2; S3) are closed and are fully driven, a second load current $I_{L2}$, for example of 50% of $I_{L1}$, flows and drives the electric motor M in a second rotation direction n2, which is the opposite direction to the first rotation direction n1, with a correspondingly reduced load.

A load situation with current flowing through the bridge arms S1 and S4 in this way may occur, in particular, when raising a motor vehicle window by means of a motor-driven window winder or when tightening, in particular in the event of a crash, a motor-driven motor vehicle belt drive; a load situation in which current flows through the bridge arms S3 and S2 in this way may occur in particular when lowering a motor vehicle window by means of a motor-driven window winder or when loosening a belt by means of a motor-driven motor vehicle belt drive.

Figure 1:
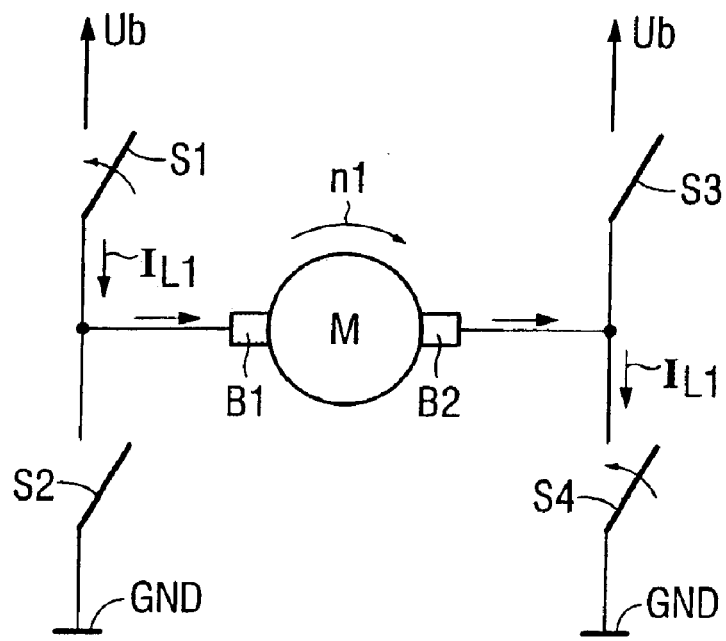
FIG. 1 shows a full bridge circuit with four bridge switching elements, which are fully driven in one rotation direction, that is to say they are not clocked and are loaded with a specific load current $I_{L1}$, in order to operate the motor with a commutator.
Figure 2:
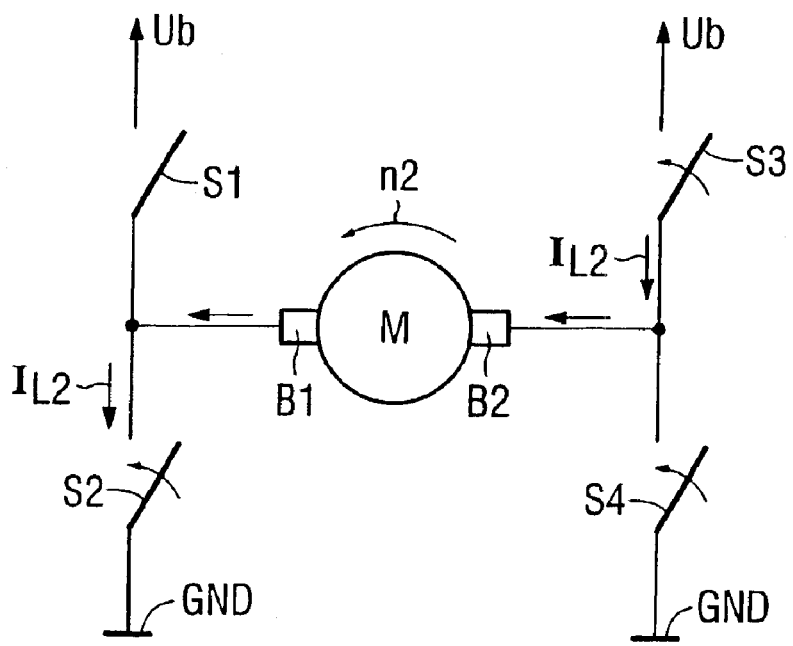
FIG. 2 shows the full bridge circuit shown in FIG. 1, fully driven in the opposite rotation direction and with a low current of $I_{L2}=0.5 I_{L1}$.
Figure 3:
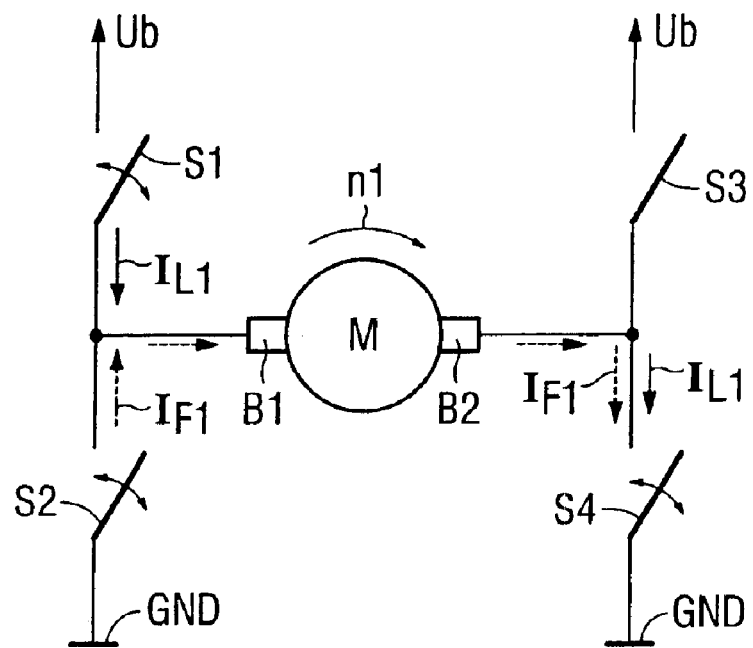
FIG. 3 shows the full bridge circuit as shown in FIG. 1 with a partial drive level corresponding to a duty ratio of the main switching elements of 75% and a freewheeling current during the pulse pauses.

FIG. 3 is based on the assumption of a load current $I_{L1}$, flowing via the bridge arm with the switching elements S1; S4 and with a motor rotation direction n1 and, in comparison to FIG. 1, on a duty ratio of, for example, 75% in order to reduce the rotation speed; in this case, and on the assumption of a freewheeling current which needs to be taken into account and is identified by the dashed line contour, the following load conditions occur for the switching elements S4; S2 through the bridges—in order to dissipate the magnetic energy during the pulse pauses:

S1 with 75% $I_{L1}$
S2 with 25% $I_{L1}$ (freewheeling current)
S3 with 0% $I_{L1}$
S4 with 100% $I_{L2}$ (motor load current)

Figure 4:
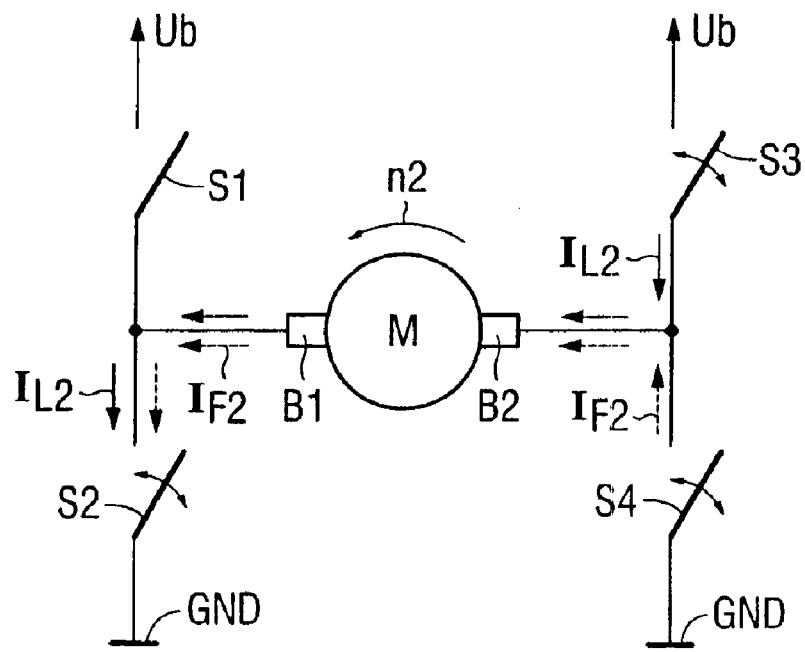
FIG. 4 shows the full bridge circuit shown in FIG. 2 with a partial drive level corresponding to a duty ratio of the main switching elements of 50% and a freewheeling current during the pulse pauses.

FIG. 4 assumes a load current of $I_{L2}=0.5\ I_{L1}$ flowing via the bridge arm with the switching elements S3; S2 and a motor rotation n2 and, in comparison to FIG. 1 and FIG. 2, a duty ratio of, for example, 50% in order to reduce the rotation speed; this results in the following load conditions:

S1 with 0% $I_{L2}$ 0%→$I_{L1}$
S2 with 100% $I_{L2}$→50% $I_{L1}$
S3 with 50% $I_{L2}$→25% $I_{L1}$
S4 with 50% $I_{L2}$→25% $I_{L1}$ By superimposing the two load situations mentioned above with the respectively assumed duty ratio, this results in the following individual maximum load on the individual bridge switching elements which, according to the invention, is used as the basis for optimizing the choice and dimensioning of the bridge switching elements in the sense of an asymmetric full bridge.

S1→75% $I_{L1}$
S2→50% $I_{L2}$
S3→25% $I_{L1}$
S4→100% $I_{L2}$

A clock frequency above the audibility limit, in particular above 20 kHz, is advantageously provided; on the basis of this clock frequency and with the load definition as in the above-mentioned exemplary embodiments, it can be assumed that, as shown in FIG. 3, the fourth bridge switching element S4 is loaded at the same time both with the load current $I_{L1}$ and with the first freewheeling current $I_{F1}$, and that, as shown in FIG. 4, the second bridge switching element S2 is loaded both with the second load current $I_{L2}$ and with the second freewheeling current $I_{F2}$.

The central idea on which the solution to the present invention is based can be summarized as follows:

The costs involved for an electrical drive apparatus, in particular a motor-driven motor vehicle window winder or motor vehicle belt roller, which can be operated via a full bridge circuit with at least four switching elements S1–S4 with a different load $I_{L1}$ or $I_{L2}$ depending on the rotation direction n1 or n2, can be reduced by the switching elements S1–S4 each being designed individually on the basis of their different maximum load, in the sense of an asymmetric full bridge.

The preceding description of the exemplary embodiments according to the present invention is intended only for illustrative purposes and not for the purpose of restricting the invention. Within the scope of the invention, various changes and modifications are possible without departing from the scope of the invention and its equivalents.

What is claimed is:

1. An electrical drive apparatus operable via a full bridge circuit comprising
   a full bridge circuit having at least first, second, third, and fourth bridge switches arranged to drive a load in two different directions, having a higher load during a first rotation direction and a lower load in a second rotation direction which is the opposite direction of the first direction, said motor driven in two rotation directions via the bridge switches, ratings of said first, second, third, and fourth bridge switches are designed on the basis of their respective maximum loads in the sense of an asymmetric full bridge, wherein the first switch has a power rating of 100% of an assumed load current, the second switch has a power rating less than the assumed load current of the first switch, the third switch has a power rating less than the assumed load current of the second switch, and the fourth switch has a power rating less than the assumed load current of the third switch.

2. A drive apparatus as claimed in claim 1, comprising mechanical relay switches as the bridge switches.

3. A drive apparatus as claimed in claim 1, comprising electronic thyristor switches as the bridge switches.

4. A drive apparatus as claimed in claim 3, comprising electronic thyristor bridge switches which are clocked in the sense of the drive apparatus having a controllable speed.

5. A drive apparatus as claimed in claim 4, comprising a clock frequency, which is above 20 kHz for the clocked electronic bridge switches.

6. A drive apparatus as claimed in claim 4, wherein the maximum load on the respective bridge switches is determined by taking into account the actual load current in the bridge path which contains this bridge switch, and of a freewheeling current in the freewheeling branch which contains these bridge switch with clocked load current drive being determined via the other bridge arm.

7. A drive apparatus as claimed in claim 1, wherein said drive is adapted for a motor-driven window winder drive or belt roller drive for a motor vehicle.

8. A drive apparatus as claimed in claim 7, wherein the power rating for the second bridge switch is 75% of an assumed load current, the power rating for the third bridge switch is 50% of an assumed load current, the power rating for the fourth bridge switch is 25% of an assumed load current.

9. A drive apparatus as claimed in claim 1, wherein the rotation speed of the window winder drive motor or belt roller winding motor being controlled via the switching duty ratio of the bridge switches.

10. Switches for an electrical two-direction drive apparatus adapted for a motor-driven window winder drive or a belt roller drive for a motor vehicle, said apparatus operable via a full bridge circuit having at least first, second, third and fourth switches having ratings, wherein the rotation speed of the motor is controlled via a switching duty ratio of the switches, said switches having different loads in each drive direction and having a higher load during use in a first rotation direction and a lower load during use in a second rotation direction opposite the first rotational direction, the rating of each switch is designed on the basis of their respective maximum loads relative to an asymmetric full bridge, wherein the rating of the first switch is 100% of an assumed load current, the rating of the second switch is 75% of an assumed load current, the rating of the third switch is 50% of an assumed load current, and the rating of the fourth switch is 25% of an assumed load current.

11. Switches as claimed in claim 10, wherein said switches are relay switches.

12. Switches as claimed in claim 10, wherein said switches are thyristor switches.

13. Switches as claimed in claim 12, wherein the switches are clocked in the sense of the drive apparatus having a controllable speed.

14. Switches as claimed in claim 13, wherein the switches have a clock frequency greater than 20 kHz.

15. Switches as claimed in claim 13, wherein the maximum load is determined by taking into account the actual load current in the bridge path which contains a bridge switch, and of a freewheeling current in a freewheeling branch which contains the bridge switch with clocked load current drive being determined via another bridge arm.

16. An electrical drive apparatus assembly comprising, an electrical two-direction rotational motor, a full bridge circuit in electrical communication with said motor, said circuit comprising at least four switches, wherein the first switch has a power rating of 100% of an assumed load current, the second switch has a power rating less than the assumed load current of the first switch, the third switch has a power rating less than the assumed load current of the second switch, and the fourth switch has a power rating less than the assumed load current of the third switch.

17. The apparatus assembly of claim 16, wherein the power rating for the second, third, and fourth switches is 75%, 50%, and 25% of the assumed load current, respectively.

18. The apparatus assembly of claim 16, wherein one of the at least four switches is a thyristor switch.

19. The apparatus assembly of claim 16, wherein at least one of the four switches is clocked in the sense of the drive apparatus having a controllable speed.

20. The apparatus assembly of claim 16, wherein a switch has a clock frequency greater than 20 kHz.

21. The apparatus assembly of claim 16, wherein a maximum load is determined by taking into account the actual load current in the bridge path containing a bridge switch, and a freewheeling current in a freewheeling branch containing the bridge switch with clock load current drive being determined via another bridge arm.

22. The apparatus assembly of claim 16, wherein the bridge switches comprise mechanical switches.

23. The apparatus assembly of claim 16, wherein the bridge switches comprise electronic switches.

24. The apparatus assembly of claim 16, wherein the rotation speed of the motor is controlled via the switching duty ratio of the bridge switches.

* * * * *

UNITED STATES PATENT AND TRADEMARK OFFICE
CERTIFICATE OF CORRECTION

PATENT NO. : 6,989,643 B2 Page 1 of 1
DATED : January 24, 2006
INVENTOR(S) : Patrick Komaromi and Gregor Svobodnik It is certified that error appears in the above-identified patent and that said Letters Patent is hereby corrected as shown below:

<u>Title page,</u>
Item [73], Assignee, delete "Siemens Aktiegesellschaft" and replace with -- Siemens Aktiengesellschaft --.

Signed and Sealed this

Twenty-eighth Day of March, 2006

JON W. DUDAS
*Director of the United States Patent and Trademark Office*